US009864969B2

(12) United States Patent
Yasunaga (10) Patent No.: US 9,864,969 B2
(45) Date of Patent: Jan. 9, 2018

(54) IMAGE PROCESSING APPARATUS FOR GENERATING MAP OF DIFFERENCES BETWEEN AN IMAGE AND A LAYOUT PLAN

(71) Applicant: Toshiba Tec Kabushiki Kaisha, Tokyo (JP)

(72) Inventor: Masaaki Yasunaga, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 29 days.

(21) Appl. No.: 14/752,649

(22) Filed: Jun. 26, 2015

(65) Prior Publication Data
US 2016/0379367 A1 Dec. 29, 2016

(51) Int. Cl.
*G06K 9/00* (2006.01)
*G06Q 10/08* (2012.01)
*G06K 9/46* (2006.01)
*G06K 9/62* (2006.01)
*G06K 9/20* (2006.01)
*G06T 7/73* (2017.01)
*G06T 7/246* (2017.01)

(52) U.S. Cl.
CPC ......... *G06Q 10/087* (2013.01); *G06K 9/2063* (2013.01); *G06K 9/46* (2013.01); *G06K 9/6201* (2013.01); *G06T 7/246* (2017.01); *G06T 7/73* (2017.01); *G06T 2207/10016* (2013.01); *G06T 2207/30244* (2013.01)

(58) Field of Classification Search
None
See application file for complete search history.

(56) References Cited

U.S. PATENT DOCUMENTS

| 2008/0306787 | A1* | 12/2008 | Hamilton | G06Q 10/06 705/7.38 |
| 2009/0059270 | A1* | 3/2009 | Opalach | G06Q 10/087 358/1.15 |
| 2010/0135522 | A1 | 6/2010 | Batt | |
| 2012/0308086 | A1* | 12/2012 | Atsmon | G06Q 30/02 382/110 |
| 2015/0220790 | A1* | 8/2015 | Gold | G06K 9/00664 382/103 |

* cited by examiner

*Primary Examiner* — Tahmina Ansari
(74) *Attorney, Agent, or Firm* — Patterson & Sheridan, LLP (57) ABSTRACT

According to one embodiment, an image processing apparatus includes an image acquiring unit, a commodity identifying unit, a commodity map generator and a commodity determination unit. The image acquiring unit acquires a number of images that are photographed, with photography ranges being varied gradually. The image identifying unit identifies a commodity and the position of that commodity based on the photographed images. The commodity map generator generates a commodity map from the photographed images, based on the commodity and commodity position identified by the image identifying unit. The commodity determination unit generates a commodity inspection map which represents differences between the commodity and commodity position shown in the commodity map and those shown in commodity layout plan information representing a commodity layout plan.

13 Claims, 10 Drawing Sheets

IMAGE PROCESSING APPARATUS FOR GENERATING MAP OF DIFFERENCES BETWEEN AN IMAGE AND A LAYOUT PLAN

FIELD

Embodiments described herein relate generally to an image processing apparatus.

BACKGROUND

Image processing apparatuses include an image processing apparatus which checks whether commodities are laid out on shelves of a store as planned in commodity layout plan information. The image processing apparatus checks how the commodities are laid out using a one-shot image. In order to check the commodities arranged in a wide range, the image processing apparatus has to use an image photographed at a distant position.

DETAILED DESCRIPTION

In general, according to one embodiment, an image processing apparatus includes an image acquiring unit, a commodity identifying unit, a commodity map generator and a commodity determination unit. The image acquiring unit acquires a number of images that are photographed with photography ranges being varied gradually. The image identifying unit identifies a commodity and the position of that commodity based on the photographed images. The commodity map generator generates a commodity map from the photographed images, based on the commodity and commodity position identified by the image identifying unit. The commodity determination unit generates a commodity inspection map which represents differences between the commodity and commodity position shown in the commodity map and those shown in commodity layout plan information (which indicates how the commodities should be laid out).

Hereinafter, embodiments will be described with reference to the drawings.

First Embodiment

An image processing apparatus according to a first embodiment will be described.

Figure 1:
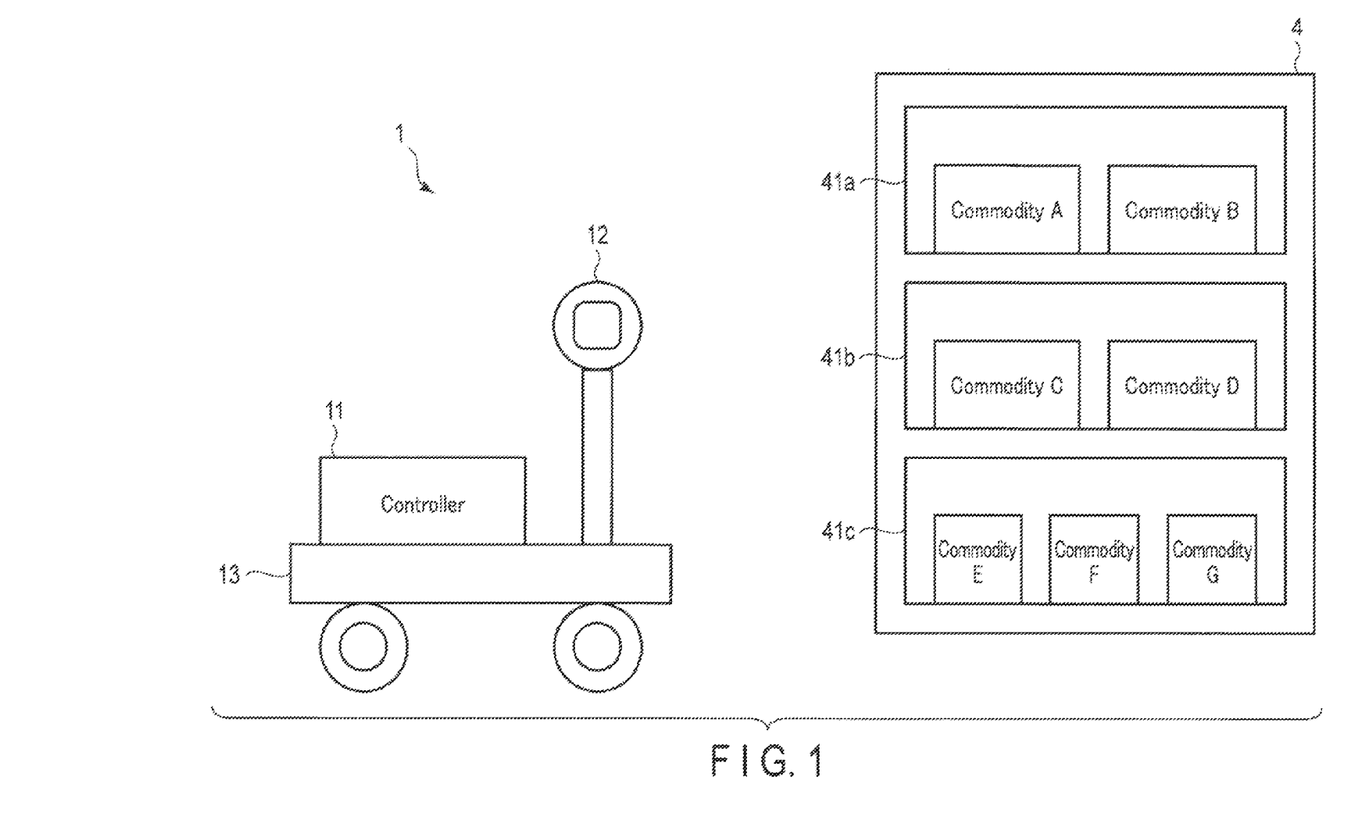
FIG. 1 is a diagram schematically showing a configuration example of an image processing apparatus of a first embodiment.

FIG. 1 is a diagram schematically showing a configuration example of an image processing apparatus 1 and a commodity shelf 4.

The image processing apparatus 1 is provided at a store or the like in which commodities are arranged on the commodity shelf 4. The image processing apparatus 1 checks if the commodities (articles) on the commodity shelf 4 are arranged appropriately. The image processing apparatus 1 may check if the commodities (articles) are laid out on the commodity shelf 4 appropriately before the store at which the commodity shelf 4 is provided opens. The image processing apparatus 1 may also check the layout of the commodities (articles) on the commodity shelf 4 periodically during business hours.

An object of the layout to be checked by the image processing apparatus 1 is not limited to commodities displayed at stores. An object of the layout to be checked by the image processing apparatus 1 is not limited to any specific commodities.

The image processing apparatus 1 includes a controller 11, a photographing unit 12, a cart 13, etc.

The controller 11 checks if the commodities are arranged appropriately based on an image photographed by the photographing unit 12. The controller 11 will be described in detail later on.

The photographing unit 12 photographs the commodity shelf 4. The photographing unit 12 is fixed at a predetermined height on the cart 13. The photographing unit 12 photographs the commodity shelf 4 partially. For example, the photographing unit 12 is fixed at such a height as enables storage space 41c to be photographed. The photographing unit 12 can therefore photograph the commodity shelf 4 partially.

The photographing unit 12 photographs the commodity shelf 4 in accordance with a signal from the controller 11. The photographing unit 12 transmits the photographed image to the controller 11.

The photographing unit 12 is, for example, a CCD camera.

The cart 13 carries the controller 11 and the photographing unit 12. The cart 13 enables the controller 11 and the photographing unit 12 to move. For example, the cart 13 makes the photographing unit 12 movable in a state where the photographing unit 12 is fixed at a predetermined height. For example, the cart 13 enables the photographing unit 12 to be fixed at a height where the commodity shelf 4 is photographable. For example, the cart 13 is moved by an attendant pushing the cart 13.

The controller 11 and the photographing unit 12 may be connected wirelessly. For example, the photographing unit 12 may be a portable camera, a smart phone, a tablet PC or the like.

The image processing apparatus 1 does not have to include the cart 13. For example, the image processing apparatus 1 may be fixed to a predetermined place. For example, the photographing unit 12 may be provided with photographing elements which fixedly photograph the respective portions of the commodity shelf 4.

The commodity shelf 4 is placed in stores etc. and contains the commodities so that the commodities are displayable. For example, the commodity shelf 4 stores the commodities in such a manner that the commodities are shown externally.

The commodity shelf 4 includes storage spaces 41a to 41c.

The storage spaces 41a to 41c store commodities. For example, the storage spaces 41a to 41c are formed in such a manner that the commodities can be arranged or taken out from a predetermined side (surface) of the commodity shelf 4. Here, the commodity shelf 4 has three storage spaces 41. The number of storage spaces 41 and the shape thereof are not limited to any specific configuration.

The commodity shelf 4 may be provided with a code display area which displays a shelf specifying code specifying the commodity shelf 4. For example, the shelf specifying code is a one-dimension code or a two-dimension code. For example, when decoded, the shelf specifying code indicates a commodity shelf ID which uniquely specifies the commodity shelf 4. The shelf specifying code may be a character string, a number, a symbol, or any combination thereof. The configuration of the shelf specifying code is not limited to any specific configuration.

The configuration example of the image processing apparatus 1 will be described below.

Figure 2:
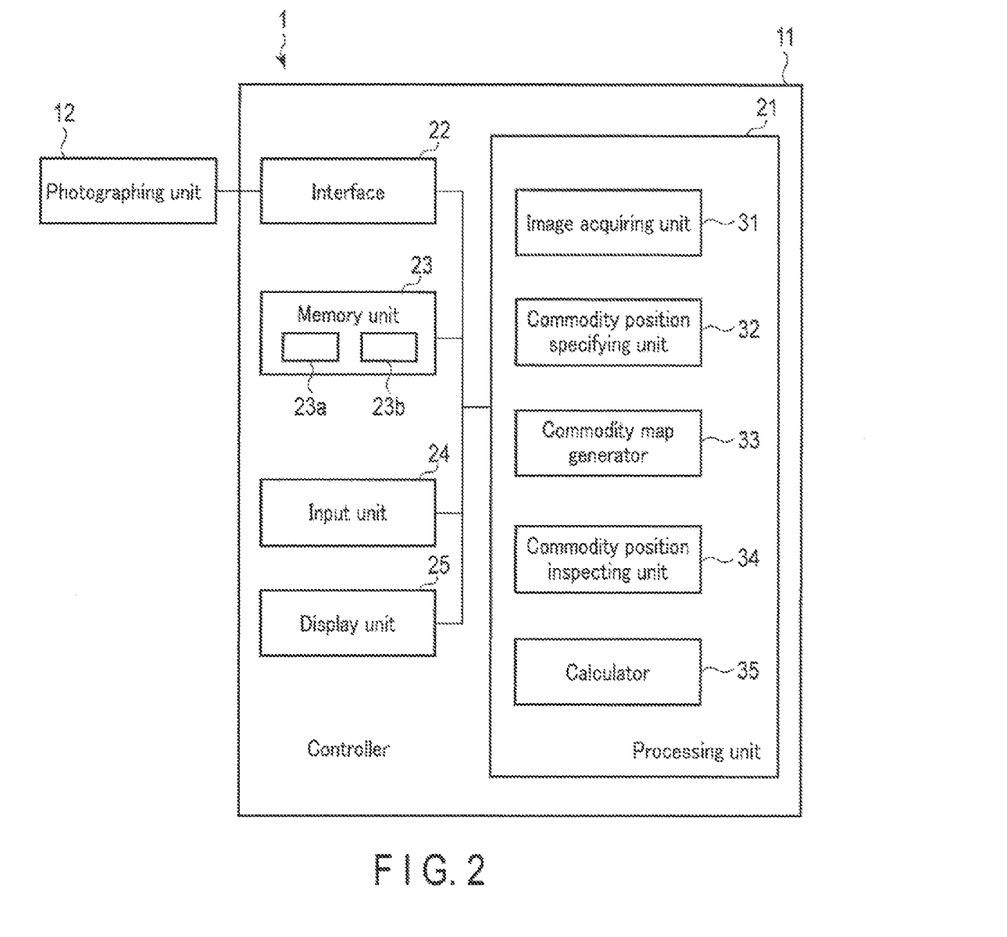
FIG. 2 is a block diagram showing a configuration example of the image processing apparatus of the first embodiment.

FIG. 2 is a block diagram showing a configuration example of the image processing apparatus 1.

As shown in FIG. 2, the image processing apparatus 1 includes the controller 11, the photographing unit 12, etc.

The controller 11 includes a processing unit 21, an interface 22, a memory unit 23, an input unit 24, and a display unit 25.

The processing unit 21 functions to control the operation of the entire image processing apparatus 1. The processing unit 21 may also include, for example, a processor (CPU), an internal memory, a ROM, a RAM, and various interfaces. The processor of the processing unit 21 realizes the function of the processing unit 21 by executing a program stored in advance in the internal memory, ROM, RAM, or memory unit 23.

Part of the various functions realized by the processing unit 21 executing the program may be realized by a hardware circuit. In this case, the processing unit 21 controls the function executed by the hardware circuit.

The ROM is a nonvolatile memory in which a control program and control data are stored in advance. The control program and the control data stored in the ROM are pre-loaded in accordance with the specifications of the image processing apparatus 1. The ROM stores, for example, a program (for example, BIOS) which controls a circuit substrate of the image processing apparatus 1.

The RAM is a volatile memory. The RAM temporarily stores data which is being processed by the processing unit 21. The RAM stores various applications based on an instruction from the processing unit 21. The RAM may also store data necessary for executing an application program, an execution result of the application program, etc.

An interface 22 communicates with the photographing unit 12. For example, the interface 22 transmits a signal for causing the photographing unit 12 to photograph an image to the photographing unit 12 in accordance with the signal from the processing unit 21. The interface 22 also transmits the image photographed by the photographing unit 12 to the processing unit 21. For example, the interface 22 may be an interface which supports USB connection.

The memory unit 23 is a volatile memory. For example, the memory unit 23 is a memory in which data may be written or rewritten. The memory unit 23 is, for example, configured by a hard disc, an SSD, or a flash memory. The memory unit 23 may also store a control program, an application, and various data in accordance with the operation purpose of the image processing apparatus 1.

The memory unit 23 includes a memory area 23a which stores commodity layout plan information and a memory area 23b which stores commodity specifying information.

The commodity layout plan information is, for example, a Planogram Master, and represents a commodity layout plan. For example, the commodity layout plan information includes information on the commodities arranged on the commodity shelf 4 and information on the positions where the commodities are arranged. For example, the commodity layout plan information includes information associating the commodities with coordinates where the commodities are located. The commodity layout plan information is stored in the memory area 23a beforehand. The commodity layout plan information may be updated at proper times.

The commodity specifying information is information for specifying the positions of the commodities arranged on the commodity shelf 4. For example, the commodity specifying information is an image of a commodity. The commodity specifying information may be a feature amount (for example, sloping information [HOG information] of the commodity image) extracted from the image of the commodity by predetermined processing. The commodity specifying information may be information indicative of the distribution of feature amounts. The commodity specifying information may be three-dimension data on a commodity, a character string of the name of a commodity, a code indicating a commodity, or the like. The configuration of the commodity specifying information is not limited to any specific configuration.

The memory area 23b may store commodity specifying information specifying a plurality of commodities carried by a store.

The input unit 24 receives various operation instructions input by an operator of the image processing apparatus 1. The input unit 24 transmits the data on the operation instructions input by the operator to the processing unit 21. The input unit 24 is, for example, a keyboard, a numeric keypad, or a touch panel.

The display unit 25 is a display device which displays various information under the control of the processing unit 21. The display unit 25 is, for example, a liquid crystal monitor. If the input unit 24 is configured by a touch panel, the display unit 25 may be formed integrally with the input unit 24.

A description will now be given of functions realized by the processing unit 21.

The processing unit 21 realizes the functions of an image acquiring unit 31, a commodity position specifying unit 32, a commodity map generator 33, a commodity position inspecting unit 34, a calculator 35, etc.

The image acquiring unit 31 acquires photographed images, with photography ranges being gradually changed. The image acquiring unit 31 acquires photographed images in which the commodity is photographed. For example, the image acquiring unit 31 transmits a signal for causing the photographing unit 12 to photograph an image to the photographing unit 12 through the interface 22. The image acquiring unit 31 acquires the image photographed by the photographing unit 12 through the interface 22. The image acquiring unit 31 acquires photographed images, with photography ranges being gradually changed. For example, the image acquiring unit 31 acquires photographed images, with photography ranges being gradually changed in a one-dimensional direction, in two-dimensional directions and in three-dimensional directions. The image acquiring unit 31 sequentially acquires photographed images at predetermined intervals. For example, the image acquiring unit 31 starts acquiring photographed images after a photography start instruction is received from the input unit 24. The image acquiring unit 31 may acquire the photographed image from an external device through a communication interface etc.

Figure 3:
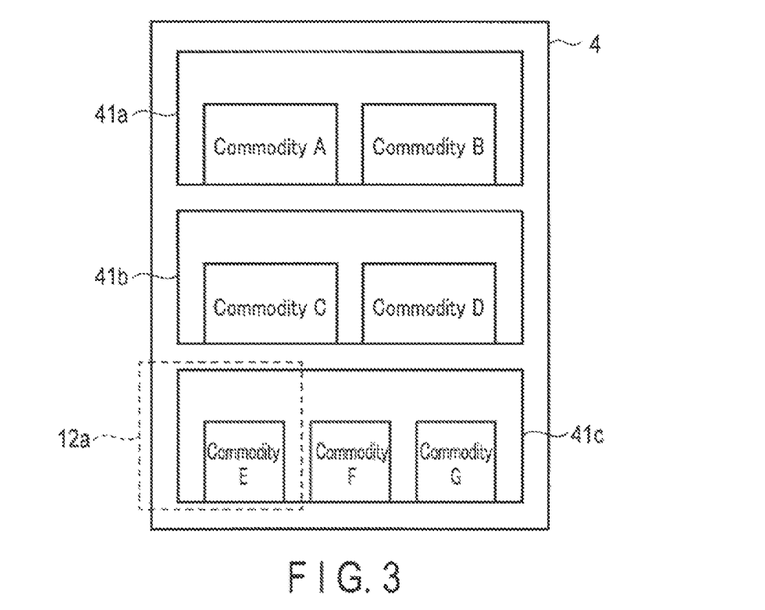
FIG. 3 is a diagram showing an example of a range which can be photographed by a photographing unit of the first embodiment.
Figure 4:
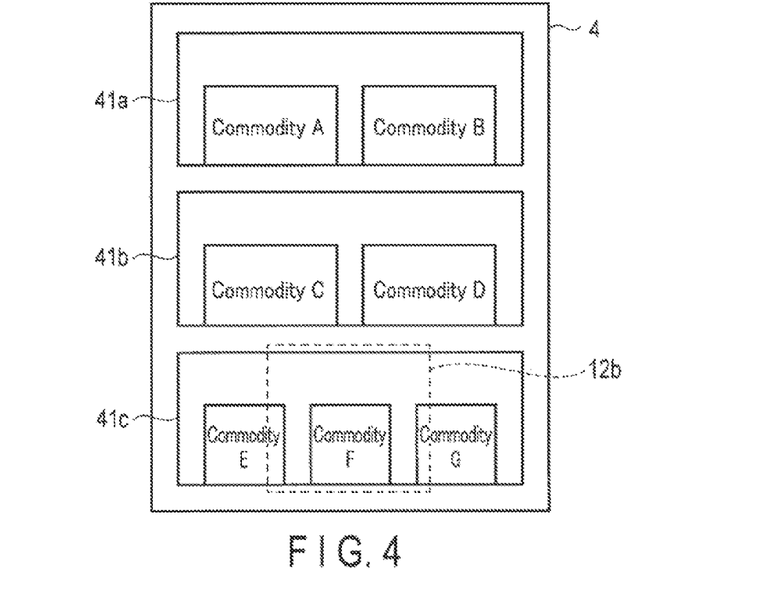
FIG. 4 is a diagram showing another example of a range which can be photographed by the photographing unit of the first embodiment.
Figure 5:
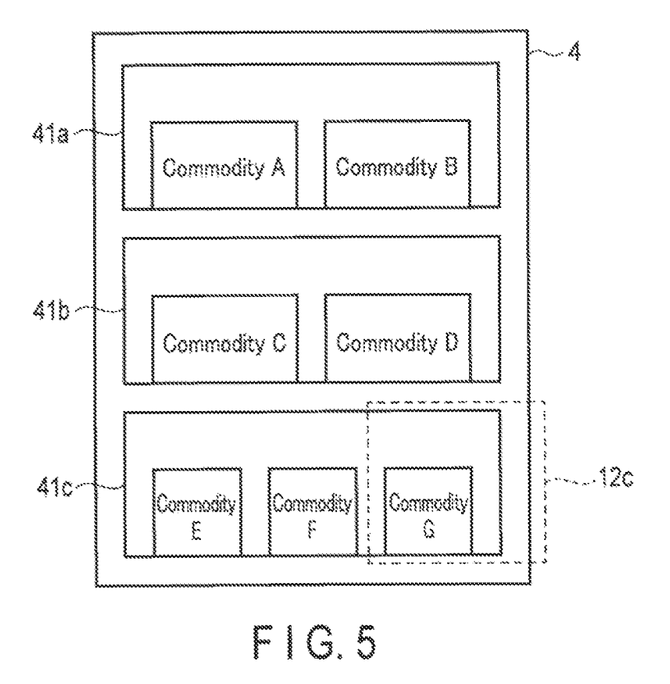
FIG. 5 is a diagram showing still another example of a range which can be photographed by the photographing unit of the first embodiment.

FIGS. 3 through 5 are diagrams showing examples of photographed images acquired by the image acquiring unit 31.

It is assumed that the photographing unit 12 is fixed at such a height as enables storage space 41c to be photographed. It is also assumed that the operator of the image processing apparatus 1 pushes the cart 1 and causes the photographing unit 12 to photograph each portion of storage space 41c. More specifically, the operator moves the cart 13 from left to right of the commodity shelf 4 as viewed in FIGS. 3 to 5.

Photography frames 12a to 12c are ranges photographed by the photographing unit 12.

In FIG. 3, the photographing unit 12 photographs the inside of photography frame 12a. In other words, the photographing unit 12 photographs commodities E in storage space 41c and the regions around commodities E. In FIG. 4, the photographing unit 12 photographs the inside of photography frame 12b. In other words, the photographing unit 12 photographs commodities F in storage space 41c and the regions around commodities F. In FIG. 5, the photographing unit 12 photographs the inside of photography frame 12c. In other words, the photographing unit 12 photographs commodities G in storage space 41c and the regions around commodities G.

The image acquiring unit 31 may automatically start acquiring photographed images. For example, the image processing apparatus 1 may be provided with a distance sensor for measuring the distance between the photographing unit 12 and an object to be photographed. For example, the image acquiring unit 31 may start acquiring photographed images when the distance measured by the distance sensor becomes smaller than a predetermined threshold. The image acquiring unit 31 may end acquiring photographed images when the distance measured by the distance sensor becomes larger than the threshold. In other words, the image acquiring unit 31 acquires photographed images when the commodity shelf 4 is within the range that can be photographed.

The commodity shelf 4 may have a display area in which a start code indicating an image acquisition start point is displayed, and a display area in which an end code indicating an image acquisition end point is displayed. The image acquiring unit 31 starts acquiring photographed images upon detection of the start code in the image photographed by the photographing unit 12, and stops acquiring the photographed images upon detection of the end code in the image photographed by the photographing unit 12.

In a photographed image acquired by the image acquiring unit 31, the commodity position specifying unit 32 (i.e., the commodity specifying unit) specifies the commodities and the positions of the commodities. For example, the commodity position specifying unit 32 acquires commodity specifying information from the memory area 23b. The commodity position specifying unit 32 performs a raster scan for the photographed image, using the commodity specifying information. Thereby, the commodities and commodity positions are specified in the photographed image. For example, the commodity position specifying unit 32 specifies the commodities and commodity positions by performing feature point matching processing, template matching, three-dimensional matching, feature amount matching, character string matching, numerical sequence matching, or the like. The method in which the commodity position specifying unit 32 specifies the commodities and commodity positions is not limited to any specific method.

The commodity map generator 33 generates a commodity map based on the commodities and commodity positions specified in a photographed image. The commodity map indicates the commodities and commodity positions in a region for which commodity arrangement is checked (e.g., the commodity shelf 4). The commodity map generator 33 generates a commodity map from a plurality of photographed images, based on the specified commodities and commodity positions.

For example, when the image acquiring unit 31 acquires the photographed images of the inside of photography frames 12a to 12c shown in FIGS. 3 through 5, the commodity map generator 33 generates a commodity map representing the commodities and commodity positions in storage space 41c.

For example, the commodity map generator 33 identifies the same commodity in a plurality of photographed images and the position where that commodity should be arranged. The commodity map generator 33 generates a commodity map by correlating a plurality of photographed images based on the positions where the same commodity is shown in the photographed images.

The commodity map generator 33 may generate a commodity map based on a change amount of the photography positions (the positions of the photographing unit 12) of the photographed images. For example, the commodity map generator 33 extracts feature points where the photographed images have local feature amounts and then extracts matching feature points where the photographed images match with one another. Based on the positions of the matching feature points, the commodity map generator 33 calculates a change amount of the photography position in the photographed images. The commodity map generator 33 may acquire a change amount of the photography position in another method. In addition, the commodity map generator 33 may acquire a moving amount of the photographing unit 12 by using data supplied from another sensor or device.

The commodity map generator 33 may generate a commodity map based on a change amount of the photography positions in addition to a commodity and a commodity position which are identified in a photographed image.

The commodity position inspecting unit 34 (commodity determination unit) checks whether the commodity and commodity position represented by the commodity map are appropriate based on the commodity layout plan information. To be more specific, the commodity position inspecting unit 34 compares the commodities and commodity positions represented by the commodity map with those represented by the commodity layout plan information, and makes a determination based on the comparison.

For example, the commodity position inspecting unit 34 acquires commodity layout plan information to be used for the check from the memory area 23a, in response to an operator's operation supplied from the input unit 24. That is, the commodity position inspecting unit 34 determines which commodity shelf 4 should be checked with respect to the commodity layout. The commodity position inspecting unit 34 may extract a shelf-specifying code of a commodity shelf 4 and use the commodity layout plan information corresponding to the commodity shelf 4 specified by the shelf-specifying code. For example, the position inspecting unit 34 may extract the shelf-specifying code by performing a raster scan with respect to the photographed image.

To be more specific, the commodity position inspecting unit 34 checks how the commodity and commodity position represented by the commodity map differ from those represented by the commodity layout plan information. For example, the commodity position inspecting unit 34 specifies a commodity and a commodity position that are included in the commodity layout plan information but are not included in the commodity map, a commodity and a commodity position that are not included in the commodity layout plan information but are included in the commodity map, a commodity and a commodity position that are located at a position different from that indicated by the commodity layout plan information, a commodity and a commodity position that are very likely to be located at a position different from that indicated by the commodity layout plan information or not to be arranged, and so on. The commodity position-inspecting unit 34 may specify a slanted commodity and the position thereof in the commodity map.

The commodity position inspecting unit 34 may determine that the commodity position represented by the commodity map and the commodity position represented by the commodity layout plan information match with each other if the difference therebetween is smaller than a predetermined threshold.

The commodity position inspecting unit 34 generates a commodity inspection map representing a difference between the commodity and commodity position represented by the commodity map and those represented by the commodity layout plan information. The commodity inspection map may be generated by adding information representing a difference to a commodity map.

The calculator 35 executes various calculations. For example, the calculator 35 may calculate a predetermined feature amount of each portion of a photographed image in order to specify a commodity in a photographed image. The calculator 35 may also calculate a predetermined feature amount of each portion of the photographed image in order to generate a commodity map.

The processing unit 21 may display a commodity map generated by the commodity map generator 33 on the display unit 25. The processing unit 21 may display a commodity inspection map generated by the commodity map inspecting unit 34 on the display unit 25.

A description will now be given of an example of an operation performed by the image processing apparatus 1.

Figure 6:
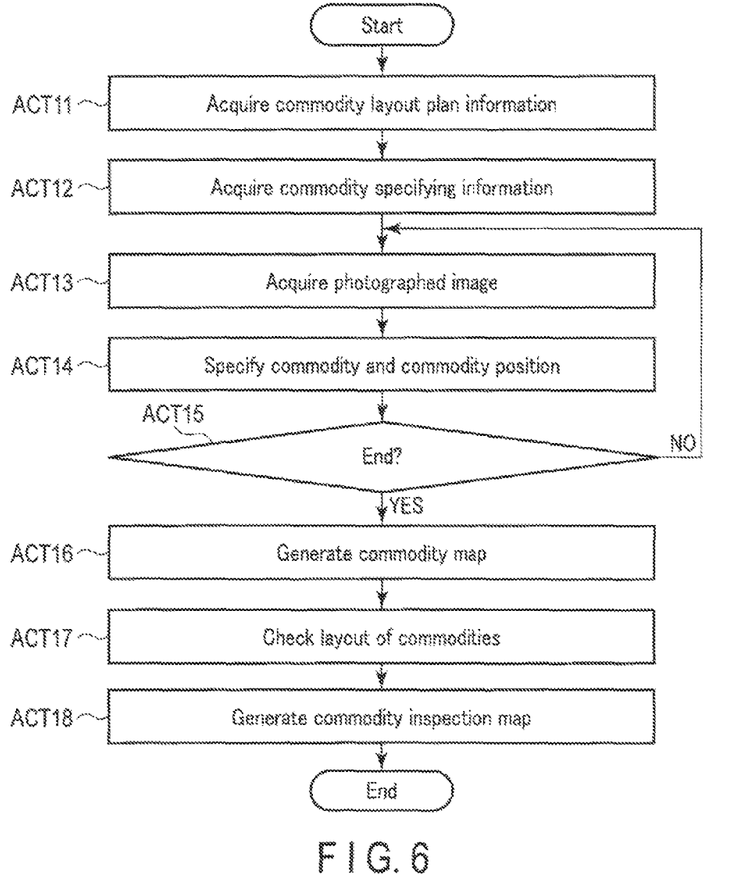
FIG. 6 is a flowchart showing an operation example of the image processing apparatus of the first embodiment.

FIG. 6 is a flowchart illustrating an example of an operation performed by the image processing apparatus 1.

First of all, the processing unit 21 of the image processing apparatus 1 acquires commodity layout plan information (ACT 11). After acquiring the commodity layout plan information, the processing unit 21 acquires commodity specifying information (ACT 12).

After acquiring the commodity specifying information, the processing unit 21 acquires a photographed image (ACT 13). When acquiring the photographed image, the processing unit 21 specifies a commodity and a commodity position based on the acquired photographed image (ACT 14). After specifying the commodity and commodity position, the processing unit 21 determines whether the acquisition of the photographed image ends (ACT 15). For example, the processing unit 21 determines whether an operation input for ending the acquisition of the photographed image is received from the input unit 24.

If the processing unit 21 determines that the acquisition of the photographed image does not end (NO in ACT 15), the processing unit 21 returns to ACT 13.

If the processing unit 21 determines that the acquisition of the photographed image ends (YES in ACT 15), the processing unit 21 generates a commodity map from a plurality of photographed images (ACT 16). After generating the commodity map, the processing unit 21 checks the layout of commodities based on the commodity map and the commodity layout plan information (ACT 17).

After checking the layout of the commodities, the processing unit 21 generates a commodity inspection map based on check results (ACT 18). After generating the commodity inspection map, the processing unit 21 ends the operation.

The processing unit 21 may display a commodity map on the display unit 25. The processing unit 21 may display a commodity inspection map on the display unit 25.

To acquire commodity layout information using a shelf specifying code, the processing unit 21 may acquire commodity layout plan information corresponding to a shelf specifying code shown in the photographed image, after the photographed image is acquired (ACT 13), after the end of the acquisition of the photographed image is determined (YES in ACT 15), or after the commodity map is generated.

The processing unit 21 may acquire commodity layout plan information after generating the commodity map (ACT 16).

Figure 7:
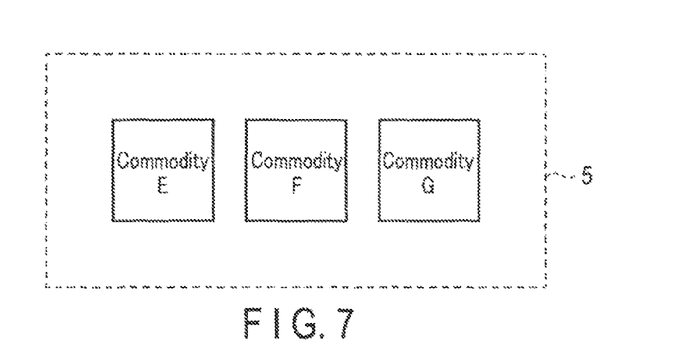
FIG. 7 is a diagram showing an example of a commodity map generated by the image processing apparatus of the first embodiment.

FIG. 7 shows an example of a commodity map which the processing unit 21 generates in ACT 16.

In the example shown in FIG. 7, the commodity map 5 is a commodity map generated from a photographed image of the inside of photography frames 12a to 12c shown in FIGS. 3 through 5. The commodity map 5 shows commodities arranged in the storage space 41c of the commodity shelf 4 and the positions where the commodities are arranged.

Figure 8:
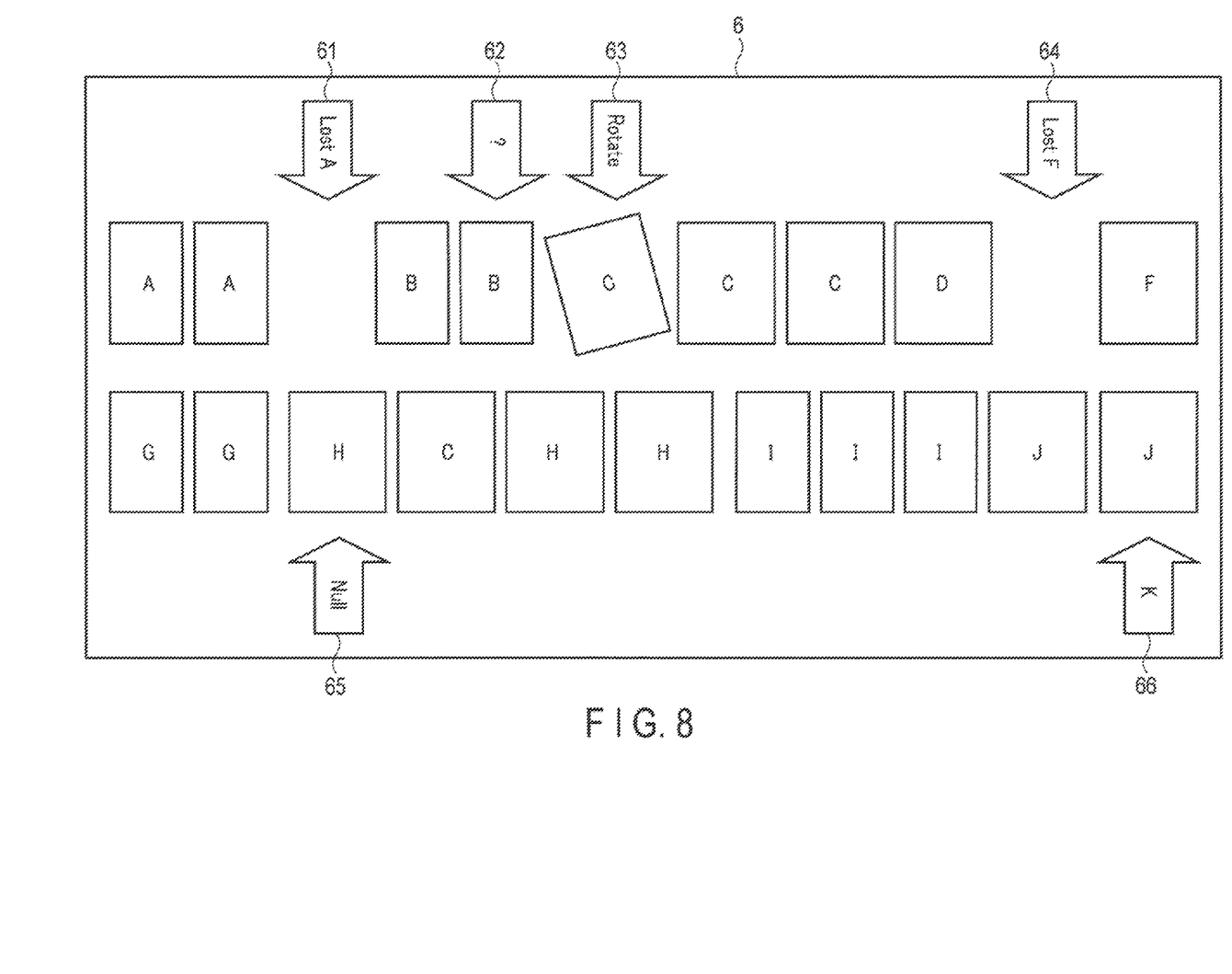
FIG. 8 is a diagram showing an example of a commodity inspection map generated by the image processing apparatus of the first embodiment.

FIG. 8 shows an example of a commodity inspection map which the processing unit 21 generates in ACT 18.

In the example shown in FIG. 8, the commodity inspection map 6 is a commodity inspection map generated from a commodity map different from commodity map 5. The commodity inspection map 6 is generated based on a commodity map showing commodities A through J.

The commodity inspection map 6 includes arrows 61-66 on a commodity map, the arrow indicating differences between the commodity inspection map 6 and the commodity map.

Arrow 61 indicates that although commodity A should be arranged in the region of arrow 61 according to the commodity layout plan information but commodity A is not located in that region according to the commodity map.

Arrow 62 indicates that a commodity not indicated by the commodity layout plan information may be located in the region of arrow 62.

Arrow 63 indicates that commodity C indicated thereby is slanted.

Arrow 64 indicates that although commodity F should be arranged in the region of arrow 64 according to the commodity layout plan information but commodity F is not located in that region according to the commodity map.

Arrow 65 indicates that no commodity should be located in the region of arrow 65 according to the commodity layout plan information.

Arrow 66 indicates that although commodity K should be arranged in the region of arrow 66 according to the commodity layout plan information but a different commodity (commodity J in this example) is located in that region according to the commodity map.

The configuration of the commodity position map is not limited to any specific configuration.

Figure 9:
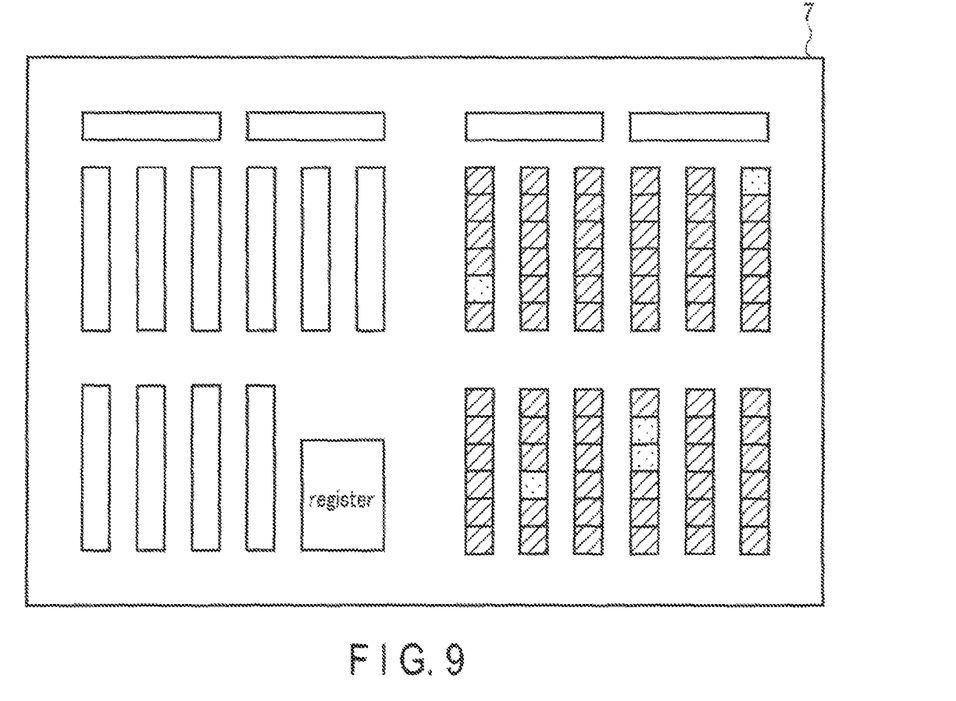
FIG. 9 is a diagram showing an example of a shelf commodity inspection map generated by the image processing apparatus of the first embodiment.

The processing unit 21 may generate a shelf commodity inspection map indicating that commodities are laid out in a plurality of commodity shelves 4. For example, the shelf commodity inspection map indicates the states of the shelves 4 in a layout diagram of the commodity shelves of a store, the states being indicated in different colors or in different patterns.

FIG. 9 shows an example of a shelf commodity inspection map.

In the example shown in FIG. 9, the shelf commodity inspection map 7 is a plan view showing the states of the commodity shelves 4. For example, in the shelf commodity inspection map 7, the commodity shelves indicated by the outlines are shelves for which the commodity layout is not checked. The commodity shelves indicated by the oblique lines are shelves for which the commodity layout is checked and is regarded as appropriate. The commodity shelves indicated by the dots are shelves for which the commodity layout is checked and is regarded as inappropriate.

The configuration of the shelf commodity inspection map is not limited to any specific one.

The processing unit 21 may prepare a list representing the differences between the commodities and commodity positions indicated by the commodity map and those indicated by the commodity layout plan information and display that list. The method in which the processing unit 21 indicates differences is not limited to any specific method.

The image processing apparatus having the afore-mentioned configurations can specify commodities and commodity positions based on a plurality of photographed images, and check whether the commodities are appropriately laid out, as scheduled in the commodity layout plan information. For this reason, the image processing apparatus uses high-resolution images and can check whether commodities are laid out appropriately even in a region which cannot be fully photographed in a one-shot image.

A synthetic image, obtained by synthesizing photographed images, may not include information that is originally included in the photographed images. The image processing apparatus specifies commodities and commodity positions by using each of the photographed images, and can prevent information from being lost. Therefore, the image processing apparatus can check commodity layout with higher accuracy than the case where commodity layout is checked using a synthetic image generated from a plurality of photographed images.

Furthermore, the image processing apparatus checks whether commodities are slanted or not. This feature enables the commodities to be visually recognized with ease.

As a result, the image processing apparatus can check the layout of the commodities effectively.

Second Embodiment

A description will be given of the second embodiment. An image processing apparatus 1 of the second embodiment differs from the image processing apparatus 1 of the first embodiment in that the former image processing apparatus 1 checks if a label is arranged at an appropriate position on a commodity shelf 4. Therefore, the other points will be indicated by the same symbols, and a detailed description thereof will be omitted.

Figure 10:
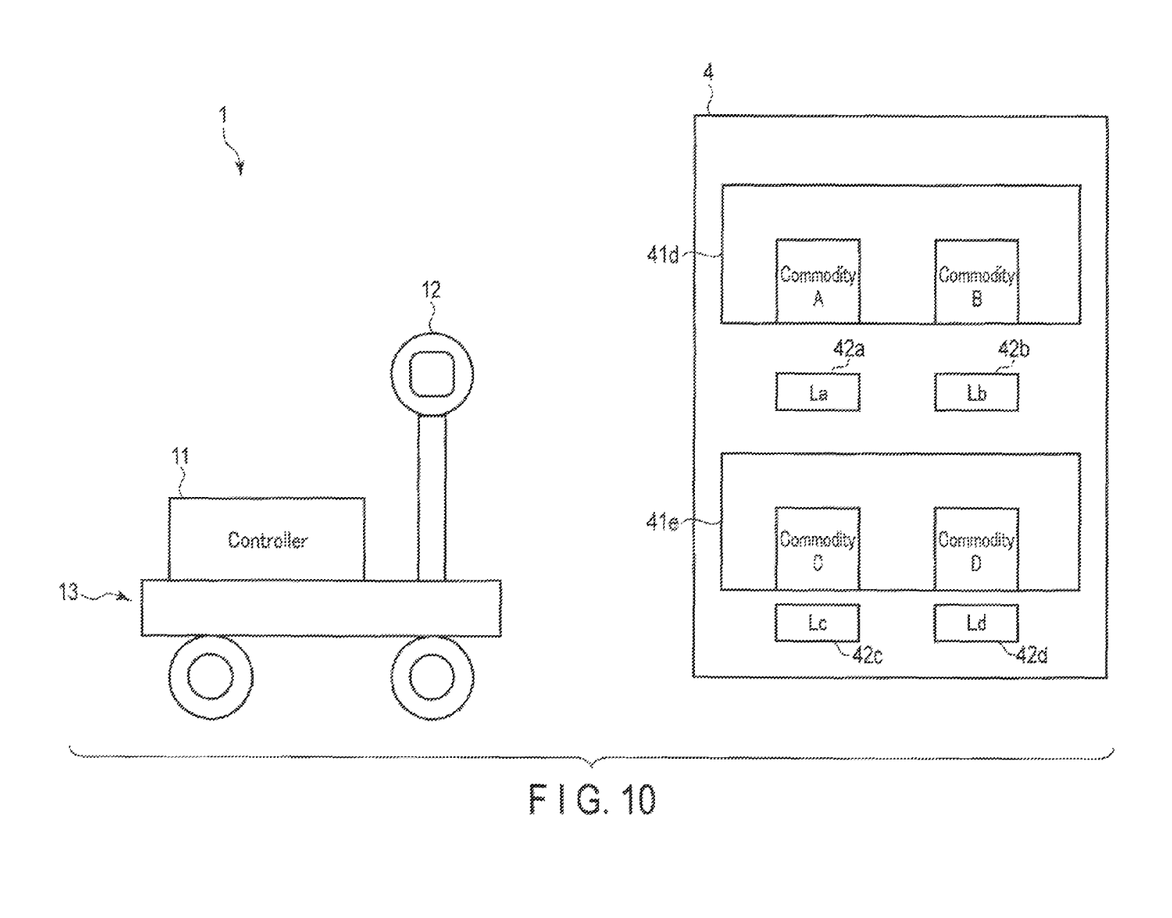
FIG. 10 is a diagram schematically showing a configuration example of an image processing apparatus of a second embodiment.

FIG. 10 is a diagram showing an example of a configuration of the image processing apparatus 1 and commodity shelf 4 of the second embodiment.

As shown in FIG. 10, the commodity shelf 4 includes storage space 41d, storage space 41e, label 42a, label 42b, label 42c, label 42d, etc.

Storage spaces 41d and 41e are similar to storage spaces 41a and 41c.

Storage space 41d stores commodity A and commodity B. Storage space 41e stores commodity C and commodity D.

Label 42 indicates details of the commodity. For example, the label 42 indicates the name, the price or the like of the corresponding commodity. Label 42 may also indicate a production area, a discount rate, a coupon, or the like. The information indicated by label 42 is not limited to any specific configuration. Label 42 may also show details of a plurality of commodities of the same kind.

Label 42 may be provided with a display area on which a label specifying code specifying the label is displayed. For example, the label specifying code is a one-dimensional code or a two-dimensional code. For example, when decoded, the label specifying code indicates a label ID which uniquely specifies label 42. The label specifying code may be a character string, a number, a symbol, or any combination thereof. The configuration of the label specifying code is not limited to any specific configuration.

For example, label 42a is located under commodity A and indicates details of commodity A. Likewise, labels 42b to 42d are located under commodities B to D and indicate details of commodities B to D, respectively. The label 42 may be arranged above the corresponding commodity. The position where label 42 is arranged is not limited to any specific position.

A description will be given of an example of a configuration of the image processing apparatus 1.

Figure 11:
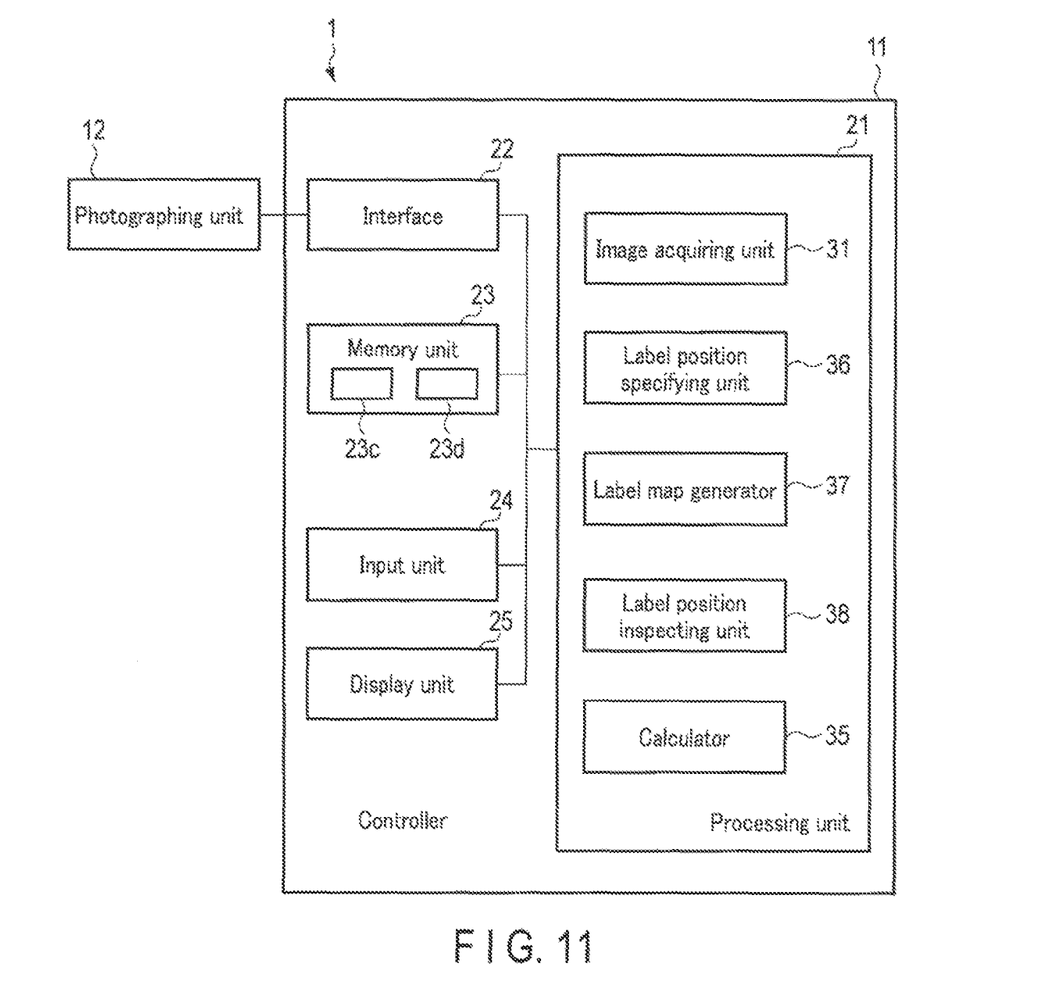
FIG. 11 is a block diagram showing a configuration example of the image processing apparatus of the second embodiment.

FIG. 11 is a block diagram showing an example of a configuration of the image processing apparatus 1.

The memory unit 23 includes memory area 23c which stores label layout plan information and memory area 23d which stores label specifying information.

The label layout plan information is, for example, a Planogram Label Master, and represents a label layout plan. For example, the label layout plan information includes information on labels 42 arranged on the commodity shelf 4 and information on the positions where the labels are arranged. For example, the label layout plan information includes information associating the labels 42 with coordinates where the labels 42 are located. The label layout plan information is stored in the memory area 23a beforehand. The label layout plan information may be updated at proper times.

The label specifying information is information for specifying the positions of the labels arranged on the commodity shelf 4. For example, the label specifying information indicates specifics of the label 42. For example, the label specifying information includes format information representing the position and size of a commodity name, the position and size of a price, the position and size of a label specifying code, etc. The configuration of the label specifying code is not limited to any specific configuration.

A description will now be given of functions realized by the processing unit 21.

The processing unit 21 realizes the functions of an image acquiring unit 31, a calculation unit 35, a label position specifying unit 36, a label map generator 37, a label position inspecting unit 38, etc.

The calculator 35 is similar to the calculator described in relation to the first embodiment.

The image acquiring unit 31 acquires photographed images in which the label 42 is photographed. The image acquiring unit 31 acquires photographed images, with photography ranges being gradually changed.

The label position specifying unit 36 (the label specifying unit) specifies labels 42 and the positions thereof, using photographed images. For example, the label position specifying unit 36 acquires label specifying information from the memory area 23d. The label position specifying unit 36 specifies labels 42 in a photography image and the positions of the labels, based on the label specifying information. For example, the label specifying unit 36 may specify the label-specifying code by performing a raster scan with respect to the photographed image. The label position specifying unit 36 may specify labels 42 by decoding the specified label-specifying codes. Alternatively, the label position specifying unit 36 may recognize the character strings on the labels 42 by character recognition processing (OCR) and specify the labels 42. The method in which the label position specifying unit 36 specifies labels 42 and the positions thereof is not limited to any specific method.

The label map generator 37 generates a label map based on the labels 42 and label positions specified in a photographed image. The label map indicates the labels 42 and label positions in a region for which label layout is checked (e.g., the commodity shelf 4). The label map generator 37 generates a label map from a plurality of photographed images, based on the specified labels 42 and label positions.

For example, the label map generator 37 identifies the same label in a plurality of photographed images and the position of that label. The label map generator 37 generates a label map by correlating a plurality of photographed images based on the positions where the same label is shown in the photographed images.

The label map generator 37 may generate a label map based on a change amount of the photography positions (the positions of the photographing unit 12) of the photographed images. For example, the label map generator 37 extracts feature points where the photographed images have local feature amounts, and then extracts matching feature points where the photographed images match with one another. Based on the positions of the matching feature points, the label map generator 37 calculates a change amount of the photography position in the photographed images. In addition, the label map generator 37 may acquire a change amount of the photography position in another method. In addition, the label map generator 37 may acquire a moving amount of the photographing unit 12 by using data supplied from another sensor or device.

The label map generator 37 may generate a label map based on a change amount of the photography positions in addition to a label 42 and a label position which are identified in a photographed image.

The label position inspecting unit 38 checks whether the label 42 and label position represented by the label map are appropriate based on the label layout plan information. To be more specific, the label position inspecting unit 38 compares the label 42 and label position represented by the label map with those represented by the label layout plan information, and makes a determination based on the comparison.

For example, the label position inspecting unit 38 (the label determination unit) acquires label layout plan information to be used for the check from the memory area 23c, in response to an operator's operation supplied from the input unit 24. That is, the label position inspecting unit 38 determines which commodity shelf 4 should be checked with respect to the label layout. The label position inspecting unit 38 may extract a shelf-specifying code of a commodity shelf 4 and use the label layout plan information corresponding to the commodity shelf 4 specified by the shelf-specifying code. For example, the label position inspecting unit 38 may extract the shelf-specifying code by performing a raster scan with respect to the photographed image.

To be more specific, the label position inspecting unit 38 checks differences between the label 42 and label position represented by the label map and those represented by the label layout plan information. For example, the label position inspecting unit 38 specifies a label 42 and a label position that are included in the label layout plan information but are not included in the label map, a label 42 and a label position that are not included in the label layout plan information but are included in the label map, a label 42 and a label position that are located at a position different from that indicated by the label layout plan information, a label 42 and a label position that are located at a position different from that indicated by the label layout plan information or that are very likely not to be arranged. The label position-inspecting unit 38 may specify a slanted label 42 and the position thereof in the label map.

The label position inspecting unit 38 may determine that the label position represented by the label map and the label position represented by the label layout plan information match with each other if the difference therebetween is smaller than a predetermined threshold.

In addition, the label position inspecting unit 38 checks generates a label inspection map representing a difference between the label 42 and label position represented by the label map and those represented by the label layout plan information. The label inspection map may be generated by adding information representing a difference to a label map. The label inspection map may include information representing whether a label 42 is slanted or not.

The processing unit 21 may display a label map generated by the label map generator 37 on the display unit 25. The processing unit 21 may display a label inspection map generated by the label map inspecting unit 38 on the display unit 25.

A description will now be given of an example of an operation performed by the image processing apparatus 1.

Figure 12:
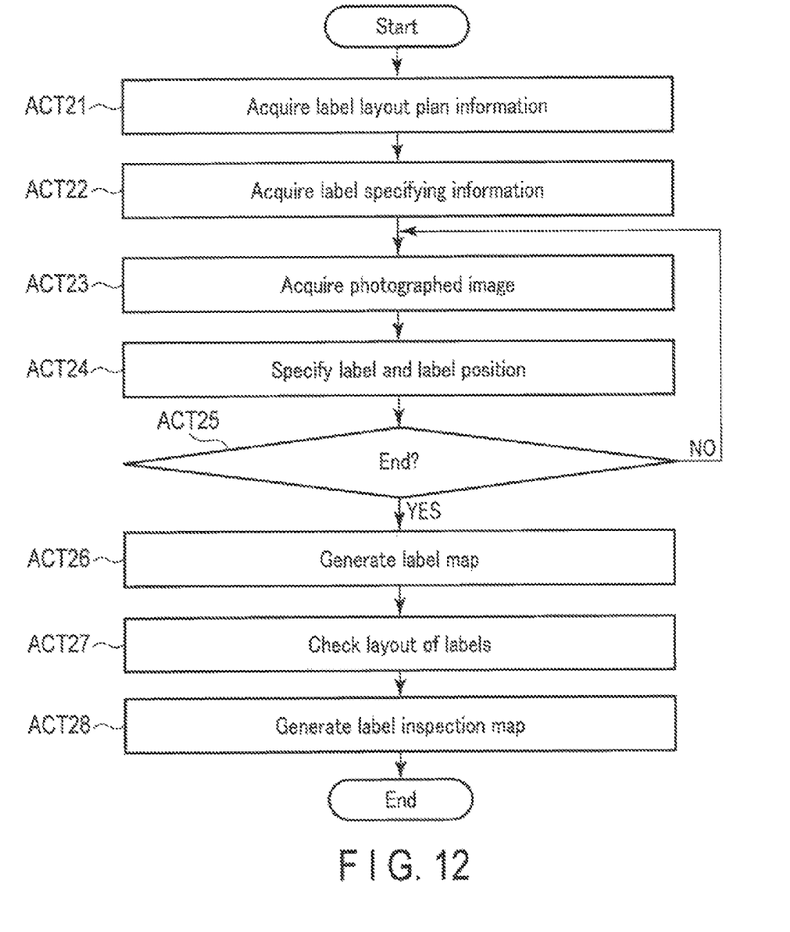
FIG. 12 is a flowchart illustrating an example of an operation performed by the image processing apparatus of the second embodiment.

FIG. 12 is a flowchart illustrating an example of an operation performed by the image processing apparatus 1.

First of all, the processing unit 21 of the image processing apparatus 1 acquires label layout plan information (ACT 21). After acquiring the label layout plan information, the processing unit 21 acquires label specifying information (ACT 22).

After acquiring the label specifying information, the processing unit 21 acquires a photographed image (ACT 23). When acquiring the photographed image, the processing unit 21 specifies a label 42 and a label position based on the acquired photographed image (ACT 24). After specifying the label 42 and label position, the processing unit 21 determines whether the acquisition of the photographed image ends (ACT 25). For example, the processing unit 21 determines whether an operation input for ending the acquisition of the photographed image is received from the input unit 24.

If the processing unit 21 determines that the acquisition of the photographed image does not end (NO in ACT 25), the processing unit 21 returns to ACT 23.

If the processing unit 21 determines that the acquisition of the photographed image ends (YES in ACT 25), the processing unit 21 generates a label map from a plurality of acquired photographed images (ACT 26). After generating the label map, the processing unit 21 checks the layout of labels based on the label map and the label layout plan information (ACT 27).

After checking the layout of the labels, the processing unit 21 generates a label inspection map based on check results (ACT 28). After generating the label inspection map, the processing unit 21 ends the operation.

The processing unit 21 may display a label map on the display unit 25. The processing unit 21 may display a label inspection map on the display unit 25.

To acquire label layout information using a shelf specifying code, the processing unit 21 may acquire label layout plan information corresponding to a shelf specifying code shown in the photographed image, after the photographed image is acquired (ACT 23), after the end of the acquisition of the photographed image is determined (YES in ACT 25), or after the label map is generated.

The processing unit 21 may acquire label layout plan information after generating the label map (ACT 26).

The processing unit 21 may generate a label inspection map indicating that labels are laid out in a plurality of commodity shelves 4. For example, the shelf label inspection map indicates the states of the shelves 4 in a layout diagram of the commodity shelves of a store, the states being indicated in different colors or in different patterns.

To be more specific, the processing unit 21 checks differences between the label 42 and label position represented by the label map and those represented by the label layout plan information, and displays the differences in the form of a list. The method in which the processing unit 21 indicates the differences is not limited to any specific method.

The image processing apparatus having the afore-mentioned configurations can specify labels and label positions based on a plurality of photographed images, and check whether the labels are appropriately laid out, as scheduled in the label layout plan information. For this reason, the image processing apparatus uses high-resolution images and can check whether labels are laid out appropriately even in a region which cannot be fully photographed in a one-shot image.

A synthetic image, obtained by synthesizing photographed images, may not include information that is originally included in the photographed images. The image processing apparatus specifies labels and label positions by using each of the photographed images, and can prevent information from being lost. Therefore, the image processing apparatus can check label layout with higher accuracy than the case where label layout is checked using a synthetic image generated from a plurality of photographed images.

Furthermore, the image processing apparatus checks whether labels are slanted or not. This feature enables the labels to be visually recognized with ease.

As a result, the image processing apparatus can check the layout of the labels effectively.

While certain embodiments have been described, these embodiments have been presented by way of example only, and are not intended to limit the scope of the inventions, Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus comprising: an image interface which acquires photographed images, with photography ranges thereof being gradually changed in at least one dimension; and a processor configured to: perform a raster scan of the photographed images, specify a commodity and a position of the commodity based on the raster scan of each of the photographed images, generate a commodity map from the photographed images, based on the specified commodity and commodity position, and generate a commodity inspection map representing differences between the commodity and commodity position shown in the commodity map and those shown in commodity layout plan information representing a commodity layout plan, wherein: the differences are indicated in the commodity inspection map by a message or a pattern, and the commodity inspection map indicates: that a first commodity not indicated by the commodity layout plan information is located in the commodity map, that a second commodity in the commodity map is located where the commodity layout plan information indicates no commodity should be located, and that a third commodity is located where the commodity layout plan information indicates a fourth commodity should be located.

2. The image processing apparatus according to claim 1, wherein
the processor is further configured to identify a slanted commodity in the commodity map, and
the commodity inspection map indicates that the commodity is slanted.

3. The image processing apparatus according to claim 1, wherein
the processor generates the commodity map based further on a change amount of the photography ranges of the photographed images.

4. The image processing apparatus according to claim 1, further comprising:
a memory which stores the commodity layout plan information,
wherein the processor is further configured to acquire the commodity layout plan information from the memory.

5. The image processing apparatus according to claim 1, further comprising:
a camera which photographs the images,
wherein the image interface acquires the photographed images from the camera.

6. An image processing apparatus comprising: an image interface which acquires photographed images, with photography ranges thereof being gradually changed in at least one dimension; and a processor configured to: perform a raster scan of the photographed images, specify a label and a label position based on the raster scan of each of the photographed images, generate a label map from the photographed images, based on the specified label and label position, and generate a label inspection map representing differences between the label and label position shown in the label map and those shown in label layout plan information representing a label layout plan, wherein the differences are indicated in the label inspection map by a message or a pattern.

7. The image processing apparatus according to claim 6, wherein
the processor is further configured to identify a slanted label in the label map, and
the label inspection map indicates that the label is slanted.

8. The image processing apparatus according to claim 6, wherein
the processor generates the label map based further on a change amount of the photography ranges of the photographed images.

9. The image processing apparatus according to claim 6, further comprising:
a memory which stores the label layout plan information,
wherein the processor is further configured to acquire the label layout plan information from the memory.

10. The image processing apparatus according to claim 6, further comprising:
a camera which photographs an image,
wherein the image interface acquires the photographed image from the camera.

11. An image processing method comprising: acquiring photographed images, with photography ranges thereof being gradually changed in at least one dimension; performing a raster scan of the photographed images; specifying a commodity and a position of the commodity based on the raster scan of each of the photographed images; generating a commodity map from the photographed images, based on the specified commodity and commodity position; and generating a commodity inspection map representing differences between the commodity and commodity position shown in the commodity map and those shown in commodity layout plan information representing a commodity layout plan, wherein: the differences are indicated in the commodity inspection map by a message or a pattern, and the commodity inspection map indicates that a first commodity not indicated by the commodity layout plan information is located in the commodity map, that a second commodity in the commodity map is located where the commodity layout plan information indicates no commodity should be located, and that a third commodity is located where the commodity layout plan information indicates a fourth commodity should be located.

12. The image processing method according to claim 11, further comprising:
identifying a slanted commodity in the commodity map, wherein the commodity inspection map indicates that the commodity is slanted.

13. The image processing method according to claim 11, wherein the commodity map is generated based further on a change amount of the photography ranges of the photographed images.

* * * * *